Figure 1:
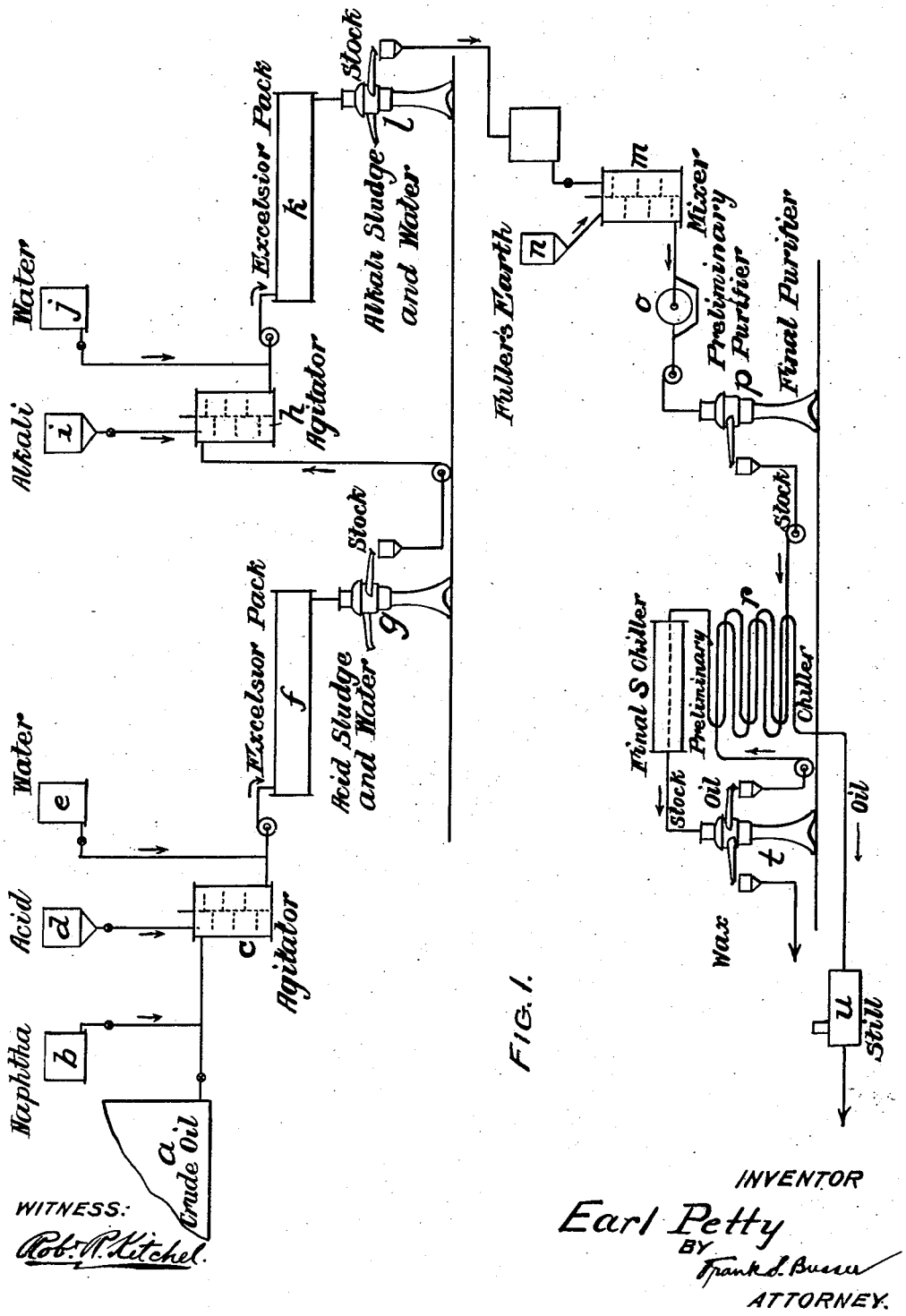

Nov. 3, 1925. 1,559,981
E. PETTY
PROCESS OF EXTRACTING WAXES FROM CRUDE PETROLEUM
Filed Sept. 15, 1921 2 Sheets-Sheet 2

WITNESS:

INVENTOR
Earl Petty
BY
ATTORNEY.

Patented Nov. 3, 1925.

1,559,981

UNITED STATES PATENT OFFICE.

EARL PETTY, OF WINFIELD, KANSAS, ASSIGNOR TO THE DE LAVAL SEPARATOR COMPANY, OF NEW YORK, N. Y., A CORPORATION OF NEW JERSEY.

PROCESS OF EXTRACTING WAXES FROM CRUDE PETROLEUM.

Application filed September 15, 1921. Serial No. 500,755.

*To all whom it may concern:*

Be it known that I, EARL PETTY, a citizen of the United States, residing at Winfield, county of Cowley, and State of Kansas, have invented a new and useful Improvement in Processes of Extracting Waxes from Crude Petroleum, of which the following is a full, clear, and exact description, reference being had to the accompanying drawings, which form a part of this specification.

In the refining of the crude oils known as paraffin base crude oils, it is customary to distill off successively products of successively higher boiling points, such as naphtha, illuminating oils, gas oils and wax distillates, leaving as a residue stock known as cylinder oil stock. The wax distillates carry in solution more or less wax (or paraffin) of a crystalline form. The cylinder oil stock contains more or less wax (or petrolatum) of an amorphous form. The wax distillates and cylinder oil stock are subjected to separate and different treatments to purify and decolorize and to separate out the wax content. Examples of such processes are set forth in applications for patents filed by me August 24, 1921, Serial Nos. 495,078 and 495,079.

The process embodying the present invention has for its object the simplification of known processes to produce crystalline wax, amorphous wax and various marketable products heretofore produced and to obtain more nearly perfect results. The object is attained by a new order and arrangement of sub-processes and more particularly by means of a different order and arrangement of the specific steps set forth in the patent applications above specified.

The more specific object of my invention is to obtain, from paraffin base crude mineral oil, wax mainly in amorphous form and wax mainly in crystalline form (paraffin) practically free from oil. The process herein described embodying my invention involves treatment of the oil before separating the waxes therefrom and the separation of these waxes, in a mixed or unresolved condition, and carrying comparatively little oil, from the crude oil before distillation, as well as the treatment of the waxes, after being so separated from the oil, to effect their separation and to eliminate from the paraffin practically all the oil that it may carry.

It is therefore necessary to describe herein the treatments to which the crude oil is subjected before the waxes are separated therefrom as well as the treatments to which the waxes are subjected after such separation. I have also herein described the treatments to which the crude oil is subjected, after the removal of the waxes, for the production of various boiling point distillates and a low pour bright stock, although these last named treatments are no part of the present process, but form part of a process described and claimed in an application, Serial No. 650,782, filed by me July 11, 1923.

Figures 2, 3:
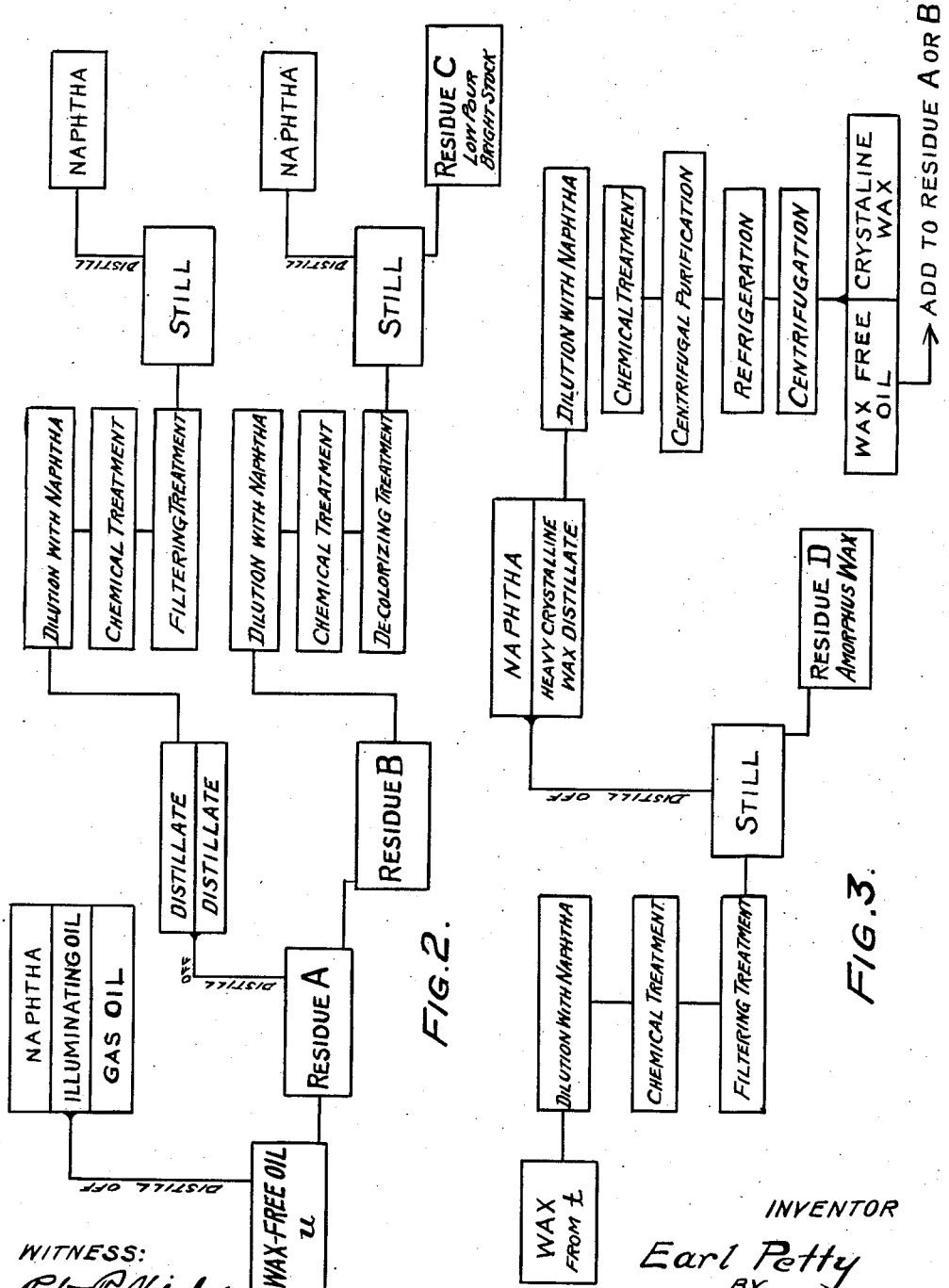

An understanding of the process may be more readily arrived at by describing the same in connection with the accompanying drawings, of which Fig. 1 is a diagram of a workable apparatus in which the first part of my process may be carried out, and Figs. 2 and 3 are diagrams of the treatments to which the originally separated oil and wax are respectively subjected.

I first add to the crude oil enough naphtha to build the oil to a 42° Bé. the crude oil supply and the naphtha supply being diagrammatically indicated at *a* and *b* in the drawing. The diluted stock is continuously transferred to a mechanical agitator *c* to which is continuously supplied a small amount of sulfuric acid from an acid tank *d*. The acid-treated oil is continuously pumped, with a stream of water, from a reservoir *e*, of about one-tenth the volume of the oil, into and through a pack of excelsior *f* and thence into a De Laval centrifugal oil separator *g*, wherein the acid sludge and acid wash water are separated from the oil. The oil from the separator is pumped continuously to a mechanical agitator *h*, to which is continuously supplied, from a tank *i*, a stream of soda ash or caustic soda. From the agitator *h*, the mixture, together with some wash water from a reservoir *j*, is pumped through an excelsior pack *k*, wherein a more thorough emulsion is effected, which emulsion continuously outflows to another centrifugal separator *l*, wherein the caustic sludge and wash water are separated from the neutralized oil. The mode of operation of the excelsior packs specified is set forth in an application filed by me August 24, 1921, Serial No. 495,080.

The thus chemically treated and partially purified oil is continuously pumped into a mechanical mixing tank *m*, to which is continuously supplied, from a supply *n*, a small proportion of fuller's earth, which is intimately mixed with the oil. From the mixer *m* the oil flows continuously into a preliminary purifier *o*, which is preferably a vacuum filter or a basket centrifuge, wherein the bulk of the fuller's earth and discoloring matter carried thereby are removed. The oil is then pumped into a De Laval centrifugal clarifier *p* wherein the oil is completely freed of the filter media and the remaining discoloring matter.

The thus chemically treated and filtered oil is then reduced to a temperature sufficient to throw the wax out of solution, say to a temperature of about 20° F. This refrigeration may be effected by running the oil through a double pipe chiller *r* in heat exchange relation with an oppositely flowing outgoing stream of cold wax-free oil and thence through a tank or tanks *s* provided with coils or shells containing refrigerated brine. The refrigerated mixture then runs into a centrifugal separator *t*, where the wax, being the heavier, is thrown to the periphery and the lighter oil displaced inwardly; wax-free oil being discharged from the light liquid outlet and wax carrying comparatively little oil from the heavy liquid outlet. The wax-free oil is then brought into heat exchange relation with the solution of oil and wax flowing toward the separator, as above described.

The wax-free crude oil is now subjected to the usual distillation (say in still *u*) for reduction to naphtha, illuminating oils and gas oil (see Fig. 2), leaving residue A. The distillation is then continued for reduction to low pour neutral oils (spindle, light, medium, heavy, red), a low pour residue B (see Fig. 2) remaining in the still.

This residue is diluted with naphtha and subjected to the same chemical and decolorizing treatments as those to which the crude oil was subjected. This treatment will be rapid. The thus purified lubricating stock is placed in steam stills or vacuum stills and carefully distilled for recovery of naphtha and reduction to finished low pour bright stock (residue C, Fig. 2).

In distilling the wax-free crude oil, as above described, after the illuminating oil has been distilled off, leaving residue A, the distillation may be carried on, as above stated, to make as many separate different gravity cuts as desired (for example, of spindle, light, medium, heavy, etc.) and each of these cuts may be diluted with naphtha and subjected to a chemical and filtration treatment as diagrammed in Fig. 2, essentially the same as that which was applied to the crude stock but operating much more rapidly. Each distillate is then reduced for separation and recovery of the naphtha. The distillation for drawing off the naphtha is done preferably in vacuum stills at a very low temperature so that the color will not be impaired.

The wax (carrying comparatively little oil) separated from the crude oil, as hereinbefore described, is warmed and then treated chemically and filtered by essentially the same process as that described for treating the crude oil, as diagrammed in Fig. 3. The wax is then heated to distill off and recover the naphtha. The temperature is then raised to distill off the proportion of crystalline wax desired. The wax distillates resulting from the above treatment corresponds in character with the products known as "wax distillates" produced by the usual process of fractional distillation of crude oil, except that the wax distillate produced by my process is much heavier in wax. Such wax distillate and the residue D (see Fig. 3) left in the still are then treated respectively as follows:

The wax distillate is treated in accordance with the process set forth in my application filed August 24, 1921. Serial No. 495,079. This process comprises dilution with naphtha, treatment with sulfuric acid, washing with water, treatment with an alkali, washing with water, removal of heavier impurities by centrifugation, and separation, of the wax and oil by refrigeration and centrifugation. The wax-free oil is added to the viscous residue remaining after the distillation of the wax from crude oil, either after all the possible distillates have been taken off (residue B) as in one described embodiment of my process, or after the illuminating oils are distilled off (residue A), as in the other described embodiment of my process. The wax may thereafter be treated by sweating as desired.

The residue D left in the wax still is amorphous and can be reduced to whatever melting point is desired and then chemically treated and filtered as desired.

In all the foregoing steps, the apparatus for chemical treatment and filtration is closed and vapor proof and the loss from evaporation of the added naphtha would be small.

While I have herein specified the additions of naphtha to the crude oil, it is desired to be understood that its addition is deemed unnecessary in case the specific gravity of the crude oil is as high as 42° Bé.

Having now fully described my invention, what I claim and desire to protect by Letters Patent is:—

1. The process of treating paraffin base crude mineral oil to obtain therefrom wax mainly in amorphous form and wax mainly in crystalline form (paraffin), which comprises subjecting oil containing said waxes to refrigeration and centrifugal separation to separate wax from the oil, and subsequently distilling the wax to drive off a crystalline wax distillate, leaving as a residue wax mainly in the amorphous form.

2. The process of treating paraffin base crude mineral oil to obtain therefrom wax mainly in amorphous form and wax mainly in crystalline form (paraffin), which comprises subjecting oil containing said waxes to refrigeration and centrifugal separation to separate from the oil wax carrying comparatively little oil, subsequently distilling the wax to drive off a crystalline wax distillate containing comparatively little oil, and subjecting the crystalline wax distillate to refrigeration and centrifugal treatment to eliminate from the crystalline wax substantially all the oil carried thereby.

3. The process of treating paraffin base crude mineral oil to obtain therefrom wax mainly in amorphous form and wax mainly in crystalline form (paraffin), which comprises subjecting oil containing said waxes to treatment with a mineral acid and an alkali, and to refrigeration and centrifugal separation to separate wax from the oil, and subsequently distilling the wax to drive off a crystalline wax distillate, leaving as a residue wax mainly in amorphous form.

4. The process of treating paraffin base crude mineral oil to obtain therefrom wax mainly in amorphous form and wax mainly in crystalline form (paraffin), which comprises subjecting oil containing said waxes to dilution with a light petroleum product, to treatment with an acid and an alkali, treatment with a decolorizing agent, and to refrigeration and centrifugal separation to separate the wax from the oil, and subsequently distilling the wax to drive off a crystalline wax distillate, leaving as a residue wax mainly in the amorphous form.

5. The process of treating paraffin base crude mineral oil to obtain therefrom wax mainly in amorphous form and wax mainly in crystalline form (paraffin), which comprises subjecting oil containing said waxes to refrigeration and centrifugal separation to separate from the oil wax carrying comparatively little oil, subsequently distilling the wax to drive off a crystalline wax distillate containing comparatively little oil, and subjecting the crystalline wax distillate to treatment with a mineral acid and an alkali and to refrigeration and centrifugal treatment to eliminate from the crystalline wax substantially all the oil carried thereby.

6. The process of treating paraffin base crude mineral oil to obtain therefrom wax mainly in amorphous form and wax mainly in crystalline form (paraffin), which comprises subjecting oil containing said waxes to refrigeration and centrifugal separation to separate from the oil wax carrying comparatively little oil, subsequently distilling the wax to drive off a crystalline wax distillate containing comparatively little oil, and subjecting the crystalline wax distillate to dilution with a light petroleum product, to treatment with a mineral acid and an alkali and to refrigeration and centrifugal treatment to eliminate from the crystalline wax substantally all the oil carried thereby.

7. The process of treating paraffin base crude mineral oil to obtain therefrom wax mainly in amorphous form and wax mainly in crystalline form (paraffin), which comprises subjecting oil containing said waxes to refrigeration and centrifugal separation to separate wax from the oil, diluting the wax with a light petroleum product, treating the wax with a mineral acid and an alkali, and distilling the diluted and chemically treated wax to drive off a crystalline wax distillate, leaving as a residue wax mainly in the amorphous form.

8. The process of treating paraffin base crude mineral oil to obtain therefrom wax mainly in amorphous form and wax mainly in crystalline form (paraffin), which comprises subjecting oil containing said waxes to refrigeration and centrifugal separation to separate from the oil wax carrying comparatively little oil, diluting the wax with a light petroleum product, treating the wax with a mineral acid and an alkali, distilling the diluted and chemically treated wax to drive off a crystalline wax distillate containing comparatively little oil, and subjecting the crystalline wax distillate to refrigeration and centrifugal treatment to eliminate from the crystalline wax substantially all the oil carried thereby.

9. The process of treating paraffin base crude mineral oil to obtain therefrom wax mainly in amorphous form and wax mainly in crystalline form (paraffin), which comprises subjecting oil containing said waxes to refrigeration and centrifugal separation to separate from the oil wax carrying comparatively little oil, diluting the wax with a light petroleum product, treating the wax with a mineral acid and an alkali, distilling the diluted and chemically treated wax to drive off a crystalline wax distillate containing comparatively little oil, diluting the crystalline wax distillate with a light petroleum product, treating with a mineral acid and an alkali, refrigerating, and centrifuging to eliminate from the crystalline wax substantially all the oil carried thereby.

10. The process of treating paraffin base crude mineral oil to obtain therefrom wax mainly in amorphous form, and wax mainly in crystalline form (paraffin), which comprises subjecting the oil, before distillation, to refrigeration and centrifugal separation to separate wax from the oil, and distilling the wax to drive off a crystalline wax distillate, leaving as a residue wax mainly in the amorphous form.

11. The process of treating paraffin base crude mineral oil to obtain therefrom wax mainly in amorphous form and wax mainly in crystalline form (paraffin), which comprises subjecting the oil, before distillation, to refrigeration and centrifugal separation to separate from the oil wax carrying comparatively little oil, subsequently distilling the wax to drive off a crystalline wax distillate containing comparatively little oil, and subjecting the crystalline wax distillate to refrigeration and centrifugal treatment to eliminate from the crystalline wax substantially all the oil carried thereby.

12. The process of treating paraffin base crude mineral oil to obtain therefrom wax mainly in amorphous form and wax mainly in crystalline form (paraffin) which comprises subjecting the oil, before distillation, to treatment with a mineral acid and an alkali, and to refrigeration and centrifugal separation to separate wax from the oil, and subsequently distilling the wax to drive off a crystalline wax distillate, leaving as a residue mainly amorphous wax.

13. The process of treating paraffin base crude mineral oil to obtain therefrom wax mainly in amorphous form and wax mainly in crystalline form (paraffin) which comprises subjecting the oil, before distillation, to dilution with a light petroleum product, to treatment with an acid and an alkali, treatment with a decolorizing agent, and to refrigeration and centrifugal separation to separate the wax from the oil, and subsequently distilling the wax to drive off a crystalline wax distillate, leaving as a residue wax mainly in the amorphous form.

14. The process of treating paraffin base crude mineral oil to obtain therefrom wax mainly in amorphous form and wax mainly in crystalline form (paraffin), which comprises subjecting the oil, before distillation, to refrigeration and centrifugal separation to separate from the oil wax carrying comparatively little oil, subsequently distilling the wax to drive off a crystalline wax distillate containing comparatively little oil, and subjecting the crystalline wax distillate to treatment with a mineral acid and an alkali and to refrigeration and centrifugal treatment to eliminate from the crystalline wax substantially all the oil carried thereby.

15. The process of treating paraffin base crude mineral oil to obtain therefrom wax mainly in amorphous form and wax mainly in crystalline form (paraffin), which comprises subjecting the oil, before distillation, to refrigeration and centrifugal separation to separate from the oil wax carrying comparatively little oil, subsequently distilling the wax to drive off a crystalline wax distillate containing comparatively little oil, and subjecting the crystalline wax distillate to dilution with a light petroleum product, to treatment with a mineral acid and an alkali and to refrigeration and centrifugal treatment to eliminate from the crystalline wax substantially all the oil carried thereby.

16. The process of treating paraffin base crude mineral oil to obtain therefrom wax mainly in amorphous form and wax mainly in crystalline form (paraffin), which comprises subjecting the oil, before distillation, to refrigeration and centrifugal separation to separate wax from the oil, diluting the wax with a light petroleum product, treating the wax with a mineral acid and an alkali, and distilling the diluted and chemically treated wax to drive off a crystalline wax distillate, leaving as a residue wax mainly in the amorphous form.

17. The process of treating paraffin base crude mineral oil to obtain therefrom wax mainly in amorphous form and wax mainly in crystalline form (paraffin) which comprises subjecting the oil, before distillation, to refrigeration and centrifugal separation to separate from the oil wax carrying comparatively little oil, diluting the wax with a light petroleum product, treating the wax with a mineral acid and an alkali, distilling the diluted and chemically treated wax to drive off a crystalline wax distillate containing comparatively little oil, and subjecting the crystalline wax distillate to refrigeration and centrifugal treatment to eliminate from the crystalline wax substantially all the oil carried thereby.

18. The process of treating paraffin base crude mineral oil to obtain therefrom wax mainly in amorphous form and wax mainly in crystalline form (paraffin), which comprises subjecting the oil, before distillation, to refrigeration and centrifugal separation to separate from the oil wax carrying comparatively little oil, diluting the wax with a light petroleum product, treating the wax with a mineral acid and an alkali, distilling the diluted and chemically treated wax to drive off a crystalline wax distillate containing comparatively little oil, diluting the crystalline wax distillate with a light petroleum product, treating with a mineral acid and an alkali, refrigerating, and centrifuging to eliminate from the crystalline wax substantially all the oil carried thereby.

In testimony of which invention, I have hereunto set my hand, at New York, on this 19th day of August, 1921.

EARL PETTY.